United States Patent
Mansell (10) Patent No.: US 9,547,530 B2
(45) Date of Patent: Jan. 17, 2017

(54) DATA PROCESSING APPARATUS AND METHOD FOR PROCESSING A PLURALITY OF THREADS

(71) Applicant: ARM Limited, Cambridge (GB)

(72) Inventor: David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 431 days.

(21) Appl. No.: 14/069,727

(22) Filed: Nov. 1, 2013

(65) Prior Publication Data

US 2015/0128144 A1    May 7, 2015

(51) Int. Cl.
| | | |
|---|---|---|
| G06F 9/46 | (2006.01) | |
| G06F 9/50 | (2006.01) | |
| G06F 9/38 | (2006.01) | |

(52) U.S. Cl.
CPC ............... *G06F 9/50* (2013.01); *G06F 9/3851* (2013.01)

(58) Field of Classification Search
None
See application file for complete search history.

(56) References Cited

U.S. PATENT DOCUMENTS

| | | | |
|---|---|---|---|
| 7,543,136 B1 | 6/2009 | Coon et al. | |
| 8,074,224 B1 * | 12/2011 | Nordquist | G06F 9/3012 |
| | | | 712/20 |
| 2007/0283356 A1 * | 12/2007 | Du | G06F 9/30123 |
| | | | 718/102 |
| 2011/0247000 A1 * | 10/2011 | Eidus | G06F 9/5088 |
| | | | 718/104 |
| 2013/0061027 A1 | 3/2013 | Chen et al. | |
| 2014/0040900 A1 * | 2/2014 | Chen | G06F 9/4806 |
| | | | 718/102 |
| 2014/0285500 A1 * | 9/2014 | Lindholm | G06T 1/20 |
| | | | 345/506 |

OTHER PUBLICATIONS

Fung et al. "Dynamic warp formation and scheduling for efficient gpu control flow." Proceedings of the 40th Annual IEEE/ACM International Symposium on Microarchitecture. IEEE Computer Society, 2007.

Narasiman et al. "Improving GPU performance via large warps and two-level warp scheduling." Proceedings of the 44th Annual IEEE/ACM International Symposium on Microarchitecture. ACM, 2011.

(Continued)

*Primary Examiner* — Lewis A Bullock, Jr.
*Assistant Examiner* — Melissa Alfred
(74) *Attorney, Agent, or Firm* — Nixon & Vanderhye P.C.

(57) ABSTRACT

A data processing apparatus has processing circuitry for processing threads each having thread state data. The threads may be processed in thread groups, with each thread group comprising a number of threads processed in parallel with a common program executed for each thread. Several thread state storage regions are provided with fixed number of thread state entries for storing thread state data for a corresponding thread. At least two of the storage regions have different fixed numbers of entries. The processing circuitry processes as the same thread group threads having thread state data stored in the same storage region and processes threads having thread state data stored in different storage regions as different thread groups.

25 Claims, 5 Drawing Sheets

(56) References Cited

OTHER PUBLICATIONS

Brunie et al. "Simultaneous branch and warp interweaving for sustained GPU performance." Proceedings of the 39th International Symposium on Computer Architecture. IEEE Press, 2012.
Meng et al. "Dynamic warp subdivision for integrated branch and memory divergence tolerance." ACM SIGARCH Computer Architecture News. vol. 38. No. 3. ACM, 2010.
Iyer et al. "Length Adaptive Processors: A Solution for the Energy/Performance Dilemma in Embedded Systems". ProQuest, 2009.
Khubaib et al. "MorphCore: An Energy-Efficient Microarchitecture for High Performance ILP and High Throughput TLP." Microarchitecture (MICRO), 2012 45th Annual IEEE/ACM International Symposium on. IEEE, 2012.
International Search Report and Written Opinion of the International Searching Authority dated Nov. 24, 2014 in PCT/GB2014/052823, 8 pages.
International Preliminary Report on Patentability issued May 12, 2016 in PCT/GB2014/052823, 6 pages.

\* cited by examiner

FIG. 1

| cycle | gPC26 | instruction at gPC | tPC0 | thread 0 operation 0 | tPC1 | thread 1 operation 1 | tPC2 | thread 2 operation 2 | ...tPCN | thread N operation N |
|---|---|---|---|---|---|---|---|---|---|---|
| 0 | #add | ADD r2,r3,r4 | #add | 2+2=4 | #add | 1+9=10 | #add | -3+22=19 | ...#add | r3(N)+r4(N) =r2(N) |
| 1 | #add+4 | CMP r2,#19 | #add+4 | NE | #add+4 | NE | #add+4 | EQ | ...#add+4 | NE |
| 2 | #add+8 | BNE #add+16 | #add+8 | Y → tPC0=#add+16 | #add+8 | Y → tPC1=#add+16 | #add+8 | N → tPC2=#add+12 | ...#add+8 | Y → tPCN=#add+16 |
| 3 | #add+12 | MUL r5,r6,r7 | #add+16 | — | #add+16 | — | #add+12 | 3x12=36 | ...#add+16 | — |
| 4 | #add+16 | STR r2,base+index | #add+16 | index=0 | #add+16 | index=1 | #add+16 | index=2 | ...#add+16 | index=N |

DATA PROCESSING APPARATUS AND METHOD FOR PROCESSING A PLURALITY OF THREADS

INTRODUCTION

Technical Field

The present technique relates to the field of data processing. More particularly, the technique relates to processing a plurality of threads.

Background

It is known to provide processing circuitry which can process a plurality of threads in thread groups, where the threads within the same thread group are processed in parallel with a common program being executed for each thread in the thread group. This can sometimes be referred to as single instruction multiple threading (SIMT) and is a form of throughput processing. However, the efficiency of this approach depends on the threads within the same thread group taking similar paths through the common program and performing data accesses to similar addresses. Divergence, where grouped threads take different paths through the code or perform data accesses to wildly different addresses, can be tolerated, but it decreases execution efficiency.

The efficiency of this type of processing may depend on how threads are grouped together in a thread group. Grouping more threads into a group may be attractive as this can increase the energy saving made by amortizing fetch, decode and memory access cost over multiple threads, but this may sacrifice efficiency if there is a highly divergent work load.

A known approach provides dynamic group reforming logic for continually reviewing the current thread groups while the threads are in flight, and regrouping threads into different groups if necessary. However, the group reforming logic costs power and area, decreasing efficiency. Also, typically the reforming logic will try to populate threads into a single fixed size of thread group, and if there are not enough similar threads to fill this group size, then the execution resources for processing the fixed size of thread group will not be fully used, reducing efficiency.

SUMMARY OF THE PRESENT TECHNIQUE

Viewed from one aspect, the present technique provides a data processing apparatus comprising:

processing circuitry configured to process a plurality of threads each having associated thread state data;

wherein the processing circuitry is configured to process the plurality of threads in a plurality of thread groups, each thread group comprising a number of threads processed in parallel with a common program being executed for each thread of the thread group;

a plurality of thread state storage regions each comprising a fixed number of thread state entries, where each thread state entry is configured to store the thread state data for a corresponding thread of the plurality of threads;

wherein at least two of the thread state storage regions have different fixed numbers of the thread state entries; and the processing circuitry is configured to process within the same thread group threads having thread state data stored in thread state entries of the same thread state storage region, and to process within different thread groups threads having thread state data stored in thread state entries of different thread state storage regions.

Each thread to be processed may have associated thread state data. A number of thread state storage regions may be provided with thread state entries for storing the thread state data. Each thread state storage region may have a fixed number of state entries and at least two of the thread state storage regions may have different fixed numbers of entries. The processing circuitry may process within the same thread group threads whose thread state data are stored in entries of the same thread state storage region, and process within different thread groups the threads having thread state data stored in different thread state storage regions.

Hence, which threads are grouped together within the same thread group depends on which region stores the corresponding thread state data for those threads, which provides a more efficient way of allocating threads to groups. By providing thread state storage regions with different fixed numbers of entries, this reduces the amount of unused resource compared to the dynamic reforming approach, since if there are fewer threads able to execute together efficiently, then this can be accommodated in one of the smaller thread state storage regions without wasting space in a larger region. It is also not necessary to provide complicated dynamic thread group reforming logic for dynamically allocating threads to groups. The thread state data can be allocated relatively statically to one of the thread state storage regions and then the corresponding threads are processed as a corresponding thread group by the processing circuitry. While it is possible to migrate thread state data from one thread state storage region to another thread state storage region, this may typically occur relatively infrequently.

Also, the present technique may provide a more efficient way of accessing thread state storage than in the dynamic group forming approach where, to avoid constantly moving state data around in a storage unit each time the groups are reformed, the grouping of threads is not dependent on which locations store the thread state data for the threads. This means that either the thread state storage unit storing the thread state data (e.g. a register bank) has to be more complex to allow the processing circuitry to obtain the thread state data for a certain group of threads which could lie in a relatively arbitrary combination of locations within the storage unit (some tracking data may be required to tie the grouping of the threads to the particular locations storing the corresponding thread state data), or a simpler storage unit can be used where threads are tied to particular lanes of the storage unit, but the dynamic group selection is constrained so that only threads from different lanes can be grouped together. While the second approach can still dynamically form different groups of threads, the number of candidate groups available for selection is reduced due to the lane constraint, and so processing is likely to be less efficient, and there would still need to be some tracking data for tracking which threads are grouped together. In contrast, with the present technique the state storage can be simplified because the thread grouping is dependent on where the thread state data is stored. Hence, the thread state data for a given thread group is stored in the same thread state storage region with respective thread state entries corresponding to the respective threads, which apart from an occasional migration event will not change through the life of the thread group.

In summary, this technique allows a range of different thread group sizes to be supported in an area and energy efficient way.

Allocation circuitry may be provided to control allocation of the thread state data for a set of threads to be processed to thread state entries of the thread state storage regions. For a given set of threads to be processed with a specified common program, a group size value may be specified indicating how many threads should be processed with that program. The group size value may be specified by a programmer of the program. For example, each thread may correspond to the processing of a different set of data values using the common program. The group size value may be set according to the number of sets of data that need to be processed by the program. The allocation circuitry may then allocate the thread state data for the set of threads to the thread state entries based on the group size value.

For example, the allocation circuitry may seek to allocate the thread state data for the set of threads to the fewest possible thread state storage regions, to reduce the number of thread groups required to implement the set of threads. The allocation circuitry may for example pack the threads into the largest possible thread state storage region first and then successfully fill smaller thread state storage regions if required to accommodate more threads.

On the other hand, it may be more efficient for the allocation circuitry to seek to allocate the thread state data for the set of threads to minimize the number of unused thread entries within partially filled thread state storage regions. For example, if there are eight threads to be executed as a group, it may be more efficient to place the corresponding thread state data in two storage regions having four thread state entries each, leaving no unused entries, than to place the thread state entries in eight entries of a storage region having 32 entries, which would waste 24 entries. By allocating the thread state data to minimize the number of unused thread entries, larger thread state storage regions can be saved for handling larger sets of threads, so that the overall processing of the processing circuitry can be made more efficient.

While the thread state storage regions each have a fixed number of thread state entries, some systems may support some reallocation of the thread state storage regions. For example, the apparatus may support multiple fixed arrangements of thread state storage regions, and one of these arrangements can be selected at a given time. Nevertheless, at any given time the allocation circuitry may select from one of a limited number of sizes thread state storage regions, depending on the current arrangement selected.

In some embodiments, each thread state storage region may comprise a separate storage unit. In other examples, each region may comprise a sub-region of a combined storage unit such as a register bank.

The thread state data may include at least one data value processed or generated by the corresponding thread, such as the contents of registers for example. For example, the thread state data may include operands used by the corresponding thread when processed by the common program, or the processing results generated for that thread. Also, the thread state data may comprise a thread program counter which indicates the next program instruction to be executed for the corresponding thread.

The thread group may have an associated thread group program counter indicating the next program instruction to be executed for the corresponding thread group. The common program may be executed in lockstep for each thread within the same thread group, with the thread group program counter indicating the instruction to be executed next. The thread group program counter may be derived from the thread program counters of all the threads in the corresponding thread group (for example, the thread group program counter may correspond to the lowest address indicated by any of the thread program counters for the group). In each processing cycle, the processing circuitry may execute the instruction indicated by the thread group program counter for any threads whose thread program counter matches the thread group program counter. Threads whose thread program counter indicates a different program instruction to the thread group program counter can wait for a later cycle when the processing reaches the instruction indicated by the thread program counter. Hence, while each thread within the same thread group is executing a common program, not all the threads need to be active in every processing cycle, and different threads may have reached different points of the program.

Migration control circuitry may be provided for controlling migration of thread state data between different thread state storage regions (hence triggering a reallocation of the thread groups). In contrast to the continuous reallocation of threads in the dynamic group reforming approach, the threads may continue to be processed in the same thread group until one of a limited set of migration events occurs. When a migration event occurs, then the migration control circuitry may migrate the thread data for at least one selected thread from a first state storage region to a second state thread storage region. Such migration events may be expected to occur relatively rarely, and so the migration operation may be relatively expensive without greatly affecting overall throughput and efficiency. Typically, the migration may be to a second thread state storage region having fewer thread state entries than the first thread state storage region. By migrating some threads' thread state data to a smaller thread state storage region, this can free the larger thread state storage region for storing thread state data for other threads which may be able to be processed more efficiently as larger group than the threads previously being processed using the first state storage region. The migration also allows for improved performance, as the old thread group associated with the non-migrated threads and the new thread group associated with the migrated threads can both execute subsequent instructions independently of each other, whereas in the pre-migration state some threads would have to wait for other threads.

For example, the migration event can be the occurrence of a difference in behavior between at least one selected thread to be migrated and at least one remaining thread having thread state data stored in the first thread state storage region. When different behavior is detected, then the threads corresponding to the first thread state storage region may not be able to be processed efficiently as a group anymore, and so splitting off some of the threads into a different group by migrating the corresponding thread state data to a different storage region can improve efficiency.

In particular, the migration may occur if the number of the selected threads having different behaviour is less than or equal to the number of thread state entries of the second thread state storage region. Hence, when the number of threads diverging from other threads is small enough to fit in the second thread state region, then the migration can occur.

In one example, the difference in behavior may occur if one or more threads still require a further processing operation to be performed while the remaining threads do not require any further processing operations. If enough threads have terminated to allow the remaining threads to fit into a narrower thread group, then this may trigger a migration of the thread state data to a different storage region for the threads which require further processing.

Similarly, a difference behavior may be detected if different processing operations are required by different threads of the group. For example, some of the threads may branch to a different point of the program not required by other threads. If so, then it may no longer be efficient to process all the threads as a single thread group, and so a migration can help to improve processing efficiency.

The difference in behavior may also include divergent memory accesses being triggered by different threads within the same thread group. Memory accesses for multiple threads can often be made more efficient by coalescing the accesses into a single memory access which obtains the data required by each of the multiple threads. However, coalescing may not be possible if threads target different cache lines of a cache memory, or different pages of the memory address space, for example. Hence, if the memory accesses for the thread group cannot be coalesced into a single memory access, then this may be detected as a migration event. By migrating at least one selected thread to a different thread group then this may allow the memory accesses for the migrated threads and non-migrated threads to be coalesced into respective memory accesses, so that they can be performed more efficiently.

Sometimes, threads which begin to diverge from each other may later converge again so that their processing operations once more become similar to each other. The migration operation may be relatively costly in terms of performance, because while the thread state data is being migrated, the processing circuitry may not be processing any of the corresponding threads. If the difference in behaviour between grouped threads only lasts for a short time, the performance penalty associated with processing the threads in a group during the period of divergence may be smaller than the performance penalty associated with performing the migration, and so it may be more efficient to continue processing these threads as a group, rather than migrating some of the threads to a different group as soon as the difference in behaviour is detected.

Therefore, a divergence counter may be maintained to indicate a number of times that divergent behavior is detected between at least one selected thread and at least one remaining thread of the same thread group. The divergence counter may be incremented each time a difference in behaviour between threads is detected (for example, an increment for each instruction for which divergence between threads is detected). If the threads return to similar processing then the divergence counter may be reset or decremented. The migration control circuitry may migrate the at least one selected thread in response to the divergence counter exceeding a predetermined migration threshold. This means that a migration occurs if the difference in behaviour persists for a certain period of time, when it is more likely that the threads will not come back together again.

Another way of detecting when to migrate threads may be to provide a divergence indicating instruction in the common program being executed by the thread group. When the divergence indicating instruction is encountered, this may trigger the migration control circuitry to detect whether there is a difference in behavior between threads within the group, and if so, then some threads may be migrated to a different thread group. Hence, the programmer of the common program can use the divergence indicating instruction as a marker to indicate that when the program reaches the marker, any threads which have begun to diverge will be unlikely to converge again and so can be migrated to improve efficiency.

In some examples, the divergence indicating instruction may be a special divergence indicating instruction which has no other functionality associated with it. However, another approach is to reuse an existing instruction, which has some functionality other than indicating divergence, as the divergence indicating instruction. A flag associated with the instruction may indicate whether the instruction should be considered as a divergence indicating instruction. For example, load/store instructions or branch instructions may be marked with a flag to indicate a divergence indicating instruction. This approach can be useful since often a load/store instruction or branch instruction will be the instruction that triggers the difference in behaviour, and so the programmer can mark load/store instructions or branch instructions to distinguish an instruction expected to cause a long period of divergence from an instruction not expected to cause a long period of divergence (such as a branch instruction for switching execution to a short section of optional code).

Not all of the thread state storage regions may be active at a time. To save energy, at least one thread state storage region which does not store thread state data for a thread group currently being processed by the processing circuitry may be placed in a power saving state. Similarly, a thread state storage region may not be filled completely with thread state data. There may be some unused thread state entries, which may be placed in the power saving state to reduce power consumption.

The size of each thread state storage region may be selected by the designer of the processing system according to the group sizes which are expected to be useful. For example, a particular system may have thread state storage regions having 32 thread state entries, thread state storage regions having four thread state entries and thread state storage regions comprising only a single thread state entry. Providing at least one thread state storage region with only a single thread state entry is useful because there may be some threads which cannot efficiently be combined in a group with any other threads, and so by providing support for a processing the thread individually, the larger thread state storage regions can be reserved for threads which can be processed efficiently as a group.

Viewed from another aspect, the present invention provides a data processing apparatus comprising:

processing means for processing a plurality of threads each having associated thread state data;

wherein the processing means is configured to process the plurality of threads in a plurality of thread groups, each thread group comprising a number of threads processed in parallel with a common program being executed for each thread of the thread group;

a plurality of thread state storage region means for storing the thread state data, each thread state storage region means comprising a fixed number of thread state entry means for storing the thread state data for a corresponding thread of the plurality of threads;

wherein at least two of the thread state storage region means have different fixed numbers of the thread state entry means; and the processing means is configured to process within the same thread group threads having thread state data stored in thread state entry means of the same thread state storage region means, and to process within different thread groups threads having thread state data stored in thread state entry means of different thread state storage region means.

Viewed from a further aspect, the present invention provides a method of processing a plurality of threads each having associated thread state data, the method comprising steps of:

processing, as a first thread group, the plurality of threads in parallel with a common program being executed for each thread of the first thread group, wherein the thread state data for the threads of the first thread group is stored in thread state entries of a first thread state storage region comprising a first fixed number of the thread state entries;

in response to a migration event, migrating the thread state data for at least one selected thread of the first thread group to thread state entries of a second thread state storage region comprising a second fixed number of the thread state entries different to the first fixed number; and in response to the thread state data in the second thread state storage region, processing as a second thread group the at least one selected thread in parallel with the common program being executed for each thread of the second thread group.

DESCRIPTION OF EXAMPLE EMBODIMENTS

Figure 1:
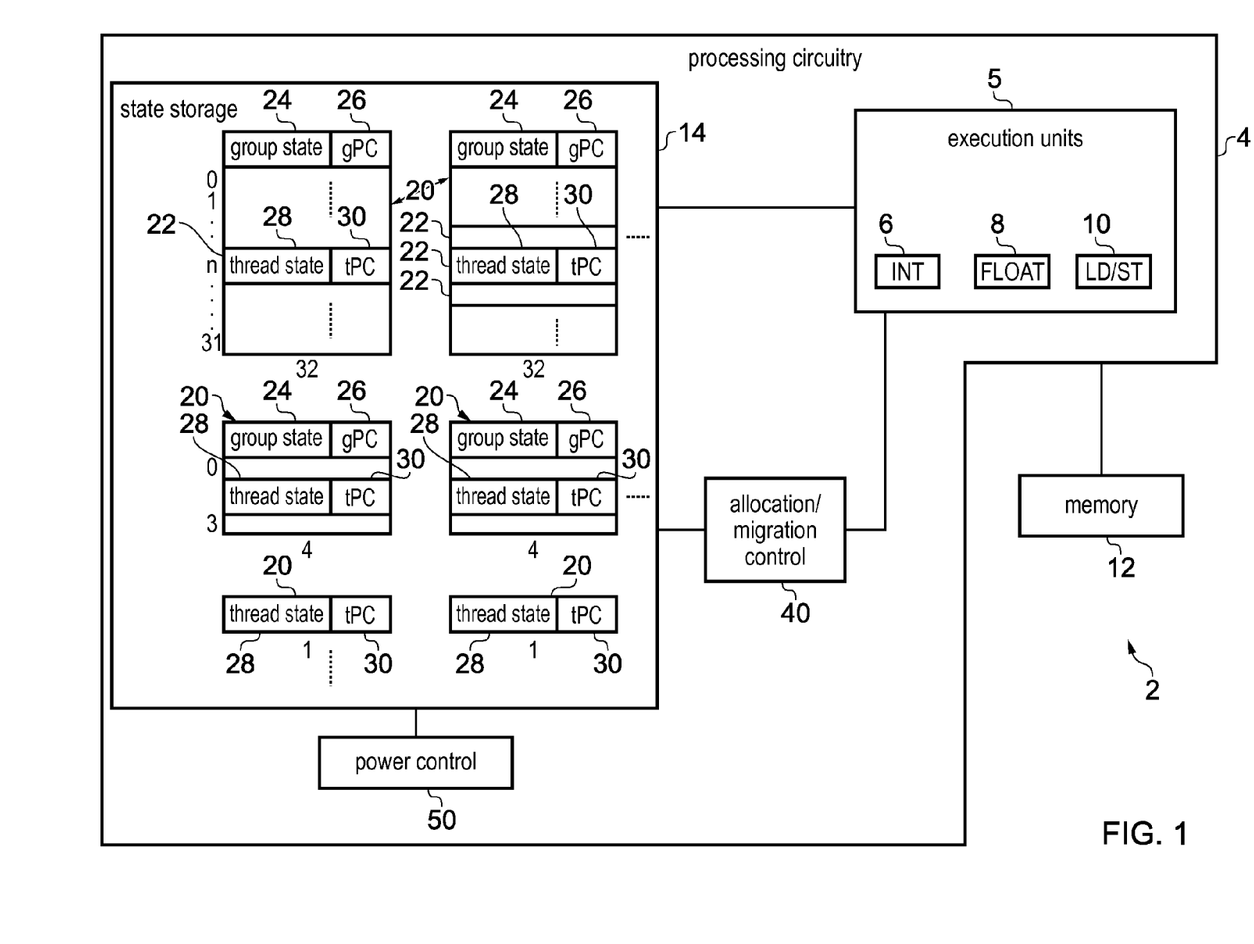
FIG. 1 schematically illustrates an example of a data processing apparatus for processing a plurality of threads each having thread state data.

FIG. 1 illustrates an example of a data processing apparatus 2 having processing circuitry 4 for processing a plurality of threads each having associated thread state data. The processing circuitry 4 includes execution units 5 for performing data processing for the threads. The execution units 5 comprise a number of processing units including an integer processing pipeline 6 for performing integer data processing operations, a floating point processing pipeline 8 for performing floating point processing operations and a load/store pipeline 10 for performing load operations for loading data from a memory 12 or storing data to the memory 12. Each processing unit 6, 8, 10 may have a number of parallel processing units which can be used to handle multiple threads of processing in parallel. In some embodiments, each of the processing units may have a certain fixed number of parallel processing units, with unused processing units being power gated if fewer than the maximum number of threads are being processed by the particular processing unit 6, 8, 10. In other examples, the processing units 6, 8, 10 may have different numbers of execution units. For example, different versions of the same processing unit 6, 8, 10 may be provided with different numbers of parallel execution units, so that for a given thread group the processing unit 6, 8, 10 having the fewest number of parallel units able to support the thread group can be used to save energy. Also, threads can be time-division multiplexed on one or more of the processing units 6, 8, 10. It will be appreciated that the processing circuitry 4 may comprise many other elements that are not illustrated in FIG. 1 for conciseness.

The processing circuitry 4 has a state storage unit 14 (e.g. a register bank) for storing thread state data for the threads being processed by the processing circuitry 4. The thread state storage unit 14 comprises a number of thread state storage regions 20 each having a fixed number of thread state entries 22 for storing the thread state data for a corresponding thread. At least two of the thread state storage regions 20 have different numbers of thread state entries 22. In this example, thread state storage regions 20 are provided with 32, 4 or 1 thread state entries 22 respectively. It will be appreciated that other arrangements of the thread state storage regions 20 may be provided with different numbers of thread state entries 22.

Each thread state storage region having more than one thread state entry 22 has a storage location for storing group state information 24 which represents a corresponding thread group comprising two or more threads. The group state information includes any information required by the thread group as a whole, and includes a group program counter (gPC) 26 which indicates the next instruction to be processed for the thread group. Each thread state entry 22 includes thread state data 28, which may for example include data values to be processed by the corresponding thread or data values generated by the processing performed for the corresponding thread. The thread state data also includes a thread program counter (tPC) 30 indicating the next instruction to be processed for the corresponding thread.

Figure 2:
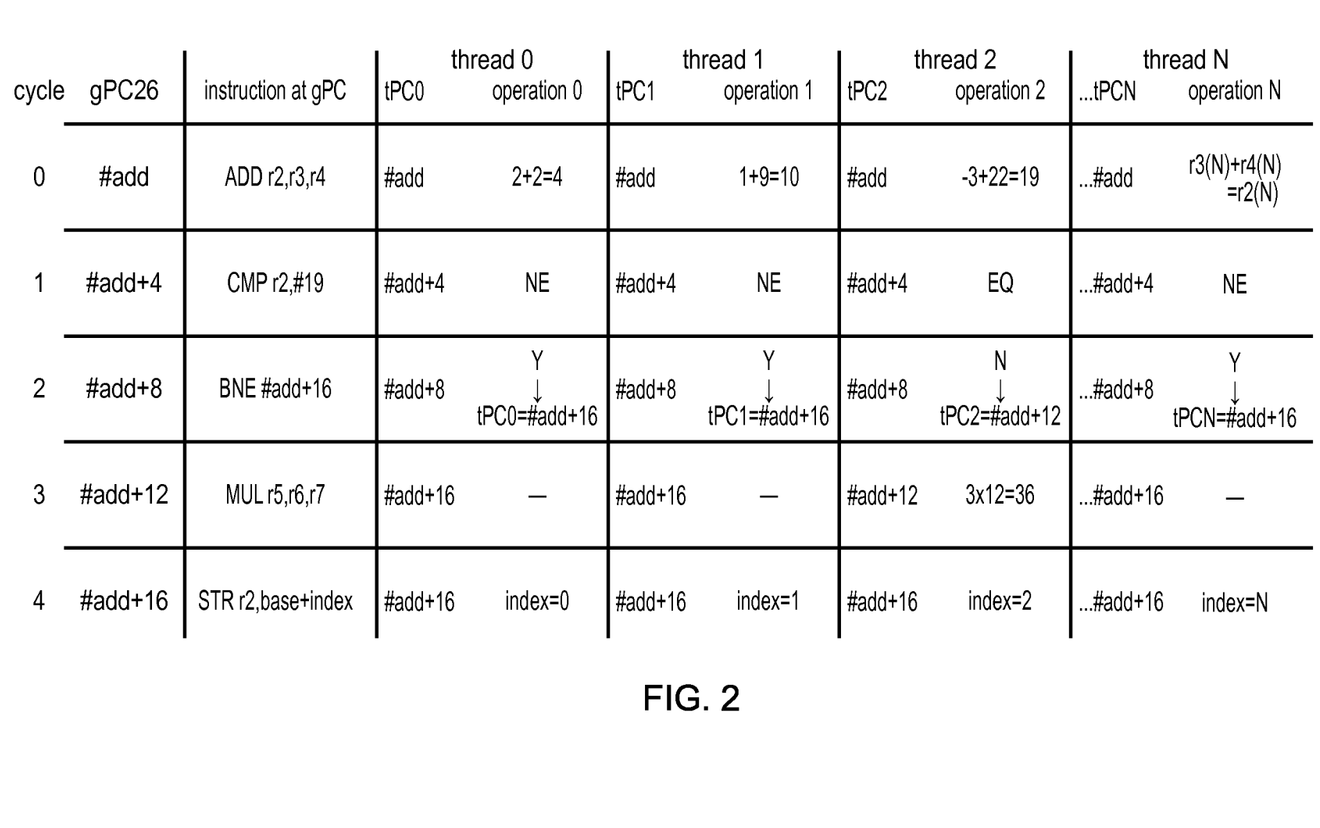
FIG. 2 illustrates processing a group of threads in parallel with a common program being executed for each thread of the group.

FIG. 2 illustrates an example of the processing of a group of N threads, with a common program being processed in lockstep by each thread of the group. The group program counter 26 indicates the address of the current instruction being processed by the group as a whole. The group program counter 26 is derived from the thread program counters 30 of the individual threads in the group (for example by program counter voting). For example, the group program counter 26 may correspond to the lowest address indicated by any of the thread program counters 30 for the group of threads. For each thread within the group, the instruction indicated by the group program counter 26 is executed in the current processing cycle if the thread program counter 30 for that thread matches the group program counter 26. In cycle 0 shown in FIG. 2, the group program counter 26 indicates address #add, and all the thread program counters 30 for threads 0 to N also indicate address #add. Therefore, all the threads execute the ADD instruction at address #add. Different threads may execute the ADD instruction using different operands so that a number of different additions are performed in parallel for the respective threads.

In cycle 2, a compare instruction CMP at address #add+4 is executed to compare the result r2 of the ADD instruction with an immediate value 19. For threads 0, 1 and N, the result r2 was not equal to 19, while for thread 2 the result r2 was equal to 19. In cycle 3, a branch instruction BNE branches to address #add+16 if the outcome of the CMP instruction in cycle 2 was not equal (NE). For threads 0, 1 and N, the branch is taken and so the thread program counters 30 for these threads are set to #add+16. However, for thread 2 the outcome of the CMP instruction was equal (EQ), and so the branch is not taken and the thread program counter 30 for thread 2 is incremented to #add+12. Hence, now there are threads with different values of the thread program counter 30, and there is different behaviour between the threads.

In cycle 3, the group program counter 26 is set to #add+12 to match the lowest of the thread program counters 30 (in this case, the thread program counter 30 for thread 2). For thread 2, the multiply instruction MUL at address #add+12 is executed. However, no instruction is executed in cycle 3 for threads 0, 1, N because the thread program counters 30 for these threads do not match the group thread program counter 26. These threads must wait until the group program counter 26 reaches #add+16 in cycle 4 before the store instruction STR at address #add+16 is executed to store a value to a memory address determined based on a base address and index, with different threads using different indices for determining the target address. The memory accesses for at least some of the threads can be coalesced into a single memory access if the indices are such that the accesses target the same region of memory (e.g. the same cache line, or the same page of the address space).

The example of FIG. 2 shows that, while the threads require the same instructions to be executed, they can be processed efficiently as a group, because this allows a single instruction fetch to be amortized across the group of threads and memory accesses to be coalesced. However, branch instructions, for example, may cause different behaviour, such as when the thread 2 required a different instruction to the other threads in the example of FIG. 2. There may be other events which cause similar differences in behaviour. In this case, there may be a significant number of cycles in which threads cannot execute their next operation because they must wait while other threads execute different operations, and this reduces efficiency. Hence, the efficiency of the processing may depend on how the threads are grouped together.

Returning to FIG. 1, the processing circuitry 4 may process as a single thread group those threads whose thread state data is stored in entries 22 of the same thread state storage region 20. Threads having their thread state data in different regions 20 may be treated as different thread groups. Hence, the allocation of the thread state data to the regions 20 determines which threads are grouped together by the processing circuitry 4. Allocation/migration control circuitry 40 may be provided to control the allocation of the thread state data to the thread groups. While FIG. 1 shows the allocation/migration control circuitry 40 as a single unit, in other examples, allocation control circuitry may be provided separately from a migration control circuitry.

A programmer may specify how many threads should be processed together as a group for a given program. This may be done for example using a group size value showing a preferred group size for a given program. For example, an image processing or graphics rendering algorithm may require a single program (such as a fragment shading program, a ray tracing program, or a program to identify pixels of interest in an image) to be executed on a certain number of pixels with each pixel being processed by a respective thread, and so the group size value may be set to correspond to the number of pixels to be processed.

The allocation circuitry 40 may use the group size to determine how to pack the thread state data 4 into the thread state storage region 20. Different allocation strategies may be used. For example, the allocation circuitry 40 may seek to minimize the number of unused thread state entries 22 within partially occupied thread state storage regions 20. For example, with the configuration shown in FIG. 1, a set of 36 threads may be packed into one 32-wide region 20 and one 4-wide region. A set of 8 threads may be packed into two 4-wide regions so that there are no unused thread state entries 22, rather than packing the 8 threads into a 32-wide region which would leave 24 unused entries 22.

Power control circuitry 50 is provided to control the power supply to the state storage unit 14. Any unused thread state storage regions 20 or unused thread state entries 22 within a partially filled thread state storage region 20 may be placed in a power saving state to save energy. For example, any known power gating technique may be used to implement the power saving state.

Once thread state data for a set of threads has been allocated to a given thread state storage region 20, then the processing circuitry may continue to process those threads as a group. However, eventually a difference in behaviour between threads of the thread group may be detected (such as in the example of FIG. 2). There may be a number of reasons why threads may diverge in behaviour.

One example is in certain computer vision algorithms which look for points of interest in an image. A thread may be started for each pixel in the image and each thread may run a test to determine if a pixel is "interesting" (i.e. it meets some given criteria). For non-interesting pixels, the thread may then terminate. For interesting pixels, the thread may then carry on with possibly extensive further processing to determine more details about the interesting point, for example, for producing a descriptor, angle and size information. Therefore, some threads may terminate much earlier than other threads. If enough threads have terminated, then it may be more efficient to move the thread state data for the remaining threads to a smaller region 20 so that they are processed as a smaller thread group. This frees one of the larger thread state storage regions 20 for handling another group, and processing the remaining threads as a smaller group can also reduce the overhead associated with the processing of the group (e.g. fewer program counter comparisons between the group program counter 26 and the thread program counters 30). Also, with a smaller thread group it is not necessary to use full width execution resources within the execution units 5, with unused execution resources being power gated for example. Another example is with a ray tracing program. Several adjacent pixels may hit the same object, thus following similar code paths. However, in other areas adjacent pixels might hit entirely different objects, and so the corresponding threads may follow different paths through the code. Once different processing operations are required for different threads, it can be more efficient to migrate some of the threads to a different region 20.

Figure 3:
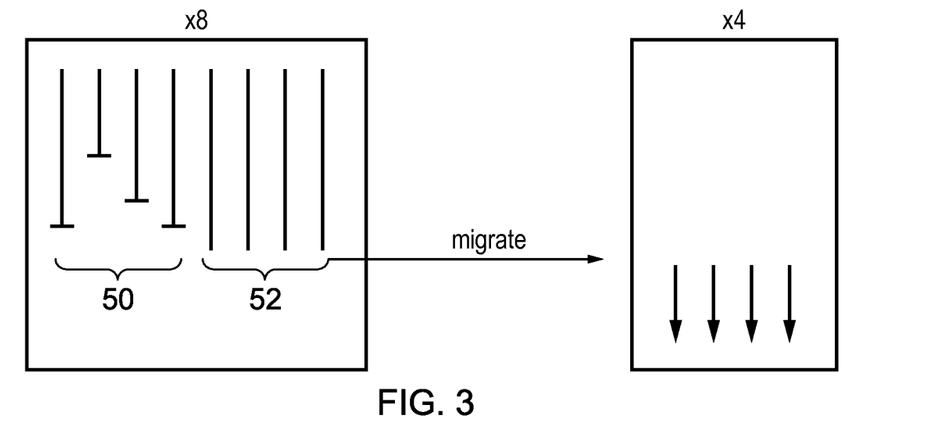
FIGS. 3 to 7 illustrate examples of migrating thread state data for threads from a larger thread state storage region to a smaller thread state storage region.

Hence, there may be a number of migration events which may trigger a migration by the migration control circuitry 40. FIGS. 3 to 7 show different examples of migration. In FIG. 3, a group of eight threads is processed, with corresponding thread state data stored in a region 20 having eight thread state entries 22. The migration control circuitry 40 detects that four of the threads 50 have terminated while four other threads 52 are still active. The migration control circuitry 40 may therefore migrate the thread state data for the unterminated threads 52 to a 4-wide thread state storage region 20 so that they can continue to be processed as a group of four threads. The 8-wide thread state storage region 22 can now be used for other threads.

Figure 4:
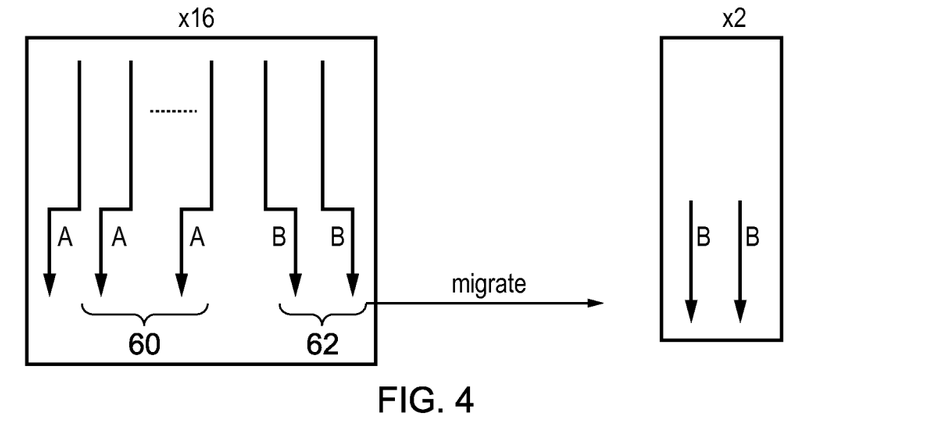

FIG. 4 shows an example where a group of sixteen threads is processed, and after some time fourteen of the threads 60 begin to follow a first path A through the program, while two threads 62 follow a second path B. The migration control circuitry 40 detects the different processing operations required by the sub-groups of threads 60, 62, and migrates the thread state data for the two threads 62 following path B to a 2-wide thread state storage region 20. The 'B' threads 62 can then be processed as a separate group from the 'A' threads 60, so that both groups can be processed more efficiently.

Figure 5:
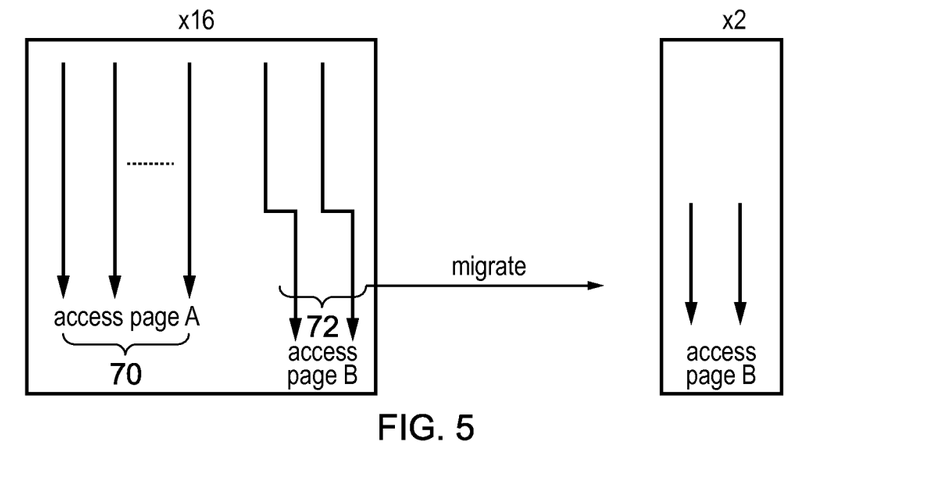

FIG. 5 shows another example in which different sub-groups 70, 72 of a group of sixteen threads require memory accesses to different pages A, B of memory. This means that the memory accesses cannot be coalesced into a single memory access (as they may require different translation lookaside buffer (TLB) entries for example). Therefore, it can be more efficient to migrate the thread state data for threads 72 to a smaller thread state storage region so that these threads are processed in a different group to threads 70.

Figure 6:
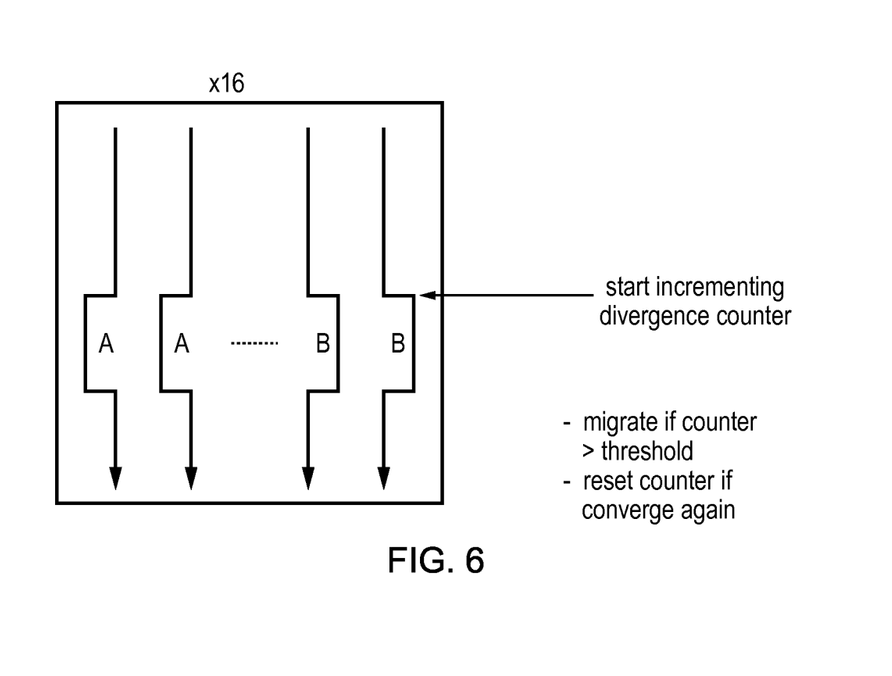

As shown in FIG. 6, it is possible for threads which begin to diverge and follow different paths A, B to later converge again so that they execute the same instructions once more. If the period of divergence lasts for only a short time then it may be more efficient to leave them as a group rather than migrating some of the threads to a different group. To detect whether divergence is likely to last a long time, a divergence counter may be maintained by the migration control circuitry 40 and the counter may be incremented for each instruction for which a different behaviour is detected for different threads. If the threads later come back together again, then the counter may be decremented or reset. If the counter reaches a given threshold, then the migration control circuitry 40 can partition the threads depending on the processing operations required at that time and migrate some of the threads to a different group. The longer the period for which divergence continues, the more likely it is that the threads will not converge again and so the more likely it is that migration will improve overall efficiency.

Figure 7:
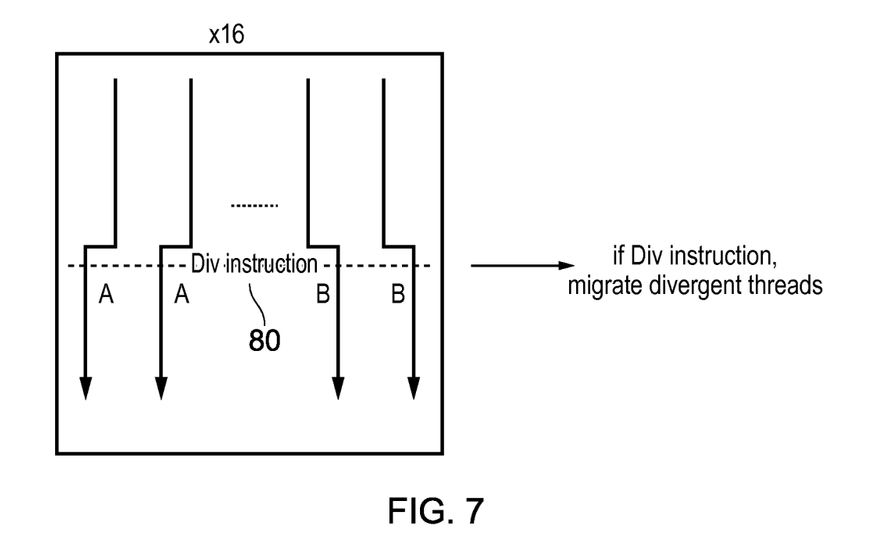

As shown in FIG. 7, a divergence indicating instruction 80 may be provided within the common program being executed for each thread. The programmer may use this instruction 80 to signify that any thread currently showing different behaviour will not converge again in the subsequent processing. For example, in the ray tracing example given above, the programmer might recognize that pixels corresponding to different objects will be entirely divergent and will not converge again. Hence, if the migration control circuitry 40 detects the divergence indicating instruction 80, then the migration control circuitry 40 may check for a difference in behaviour between threads, and migrate at least some threads to a different group. There may be many other examples in which it is useful to migrate some threads' state data to a different thread state storage region to trigger processing in a different thread group. The divergence indicating instruction may be a dedicated divergence indicating instruction, or another type of instruction such as a load/store or branch instruction marked with a flag by the programmer to signal that it is likely to trigger a relatively long period of divergence.

Figure 8:
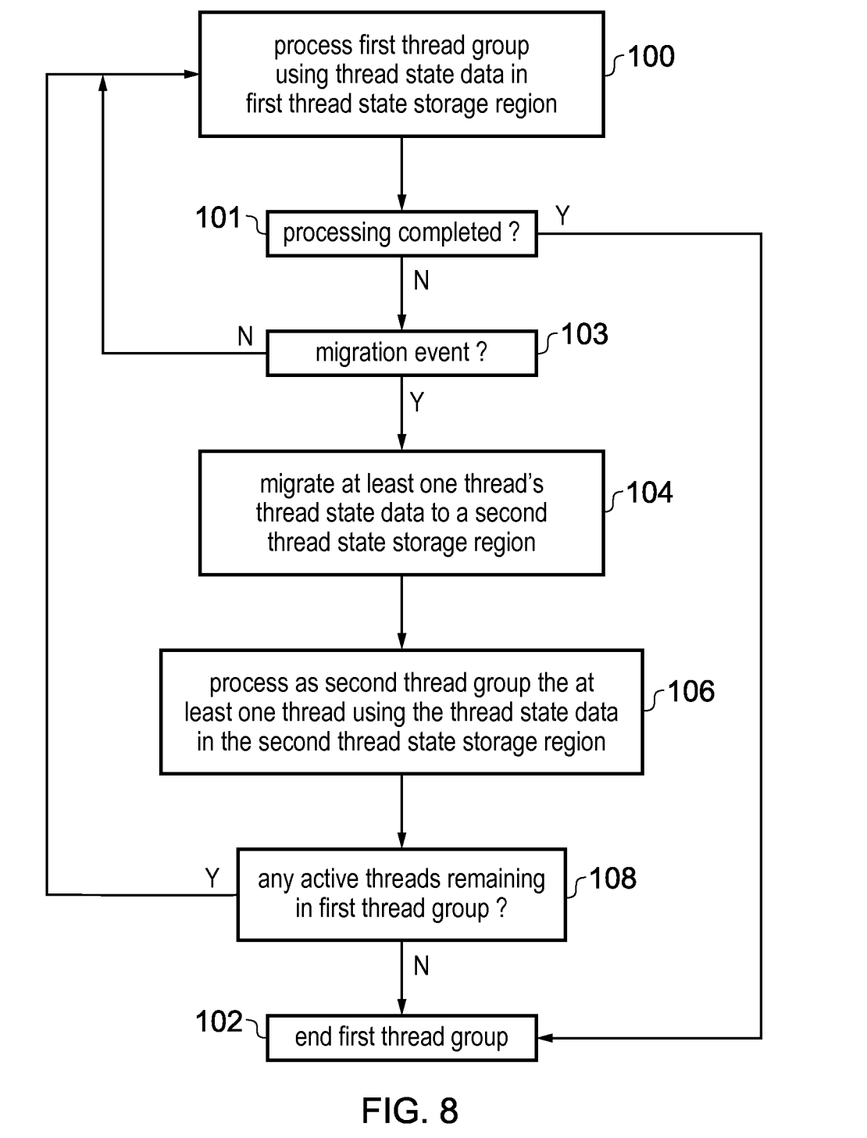
FIG. 8 schematically illustrates a method of processing a plurality of threads.

FIG. 8 shows a method of processing threads. At step 100 a first thread group is processed, with a common program being executed in parallel for each thread of the group using the thread state data stored in a first thread state storage region 20. At step 101, it is determined whether processing of the first thread group is complete (i.e. all threads have terminated). If so, then at step 102, the first thread group ends and the allocation circuitry 40 makes the first thread state storage region 20 available for storing thread state data for another group of threads. If processing of the first thread group has not yet completed, then at step 103 the migration control circuitry 40 determines whether there is a migration event. If no migration event has occurred, then processing of the first thread group continues at step 100.

If a migration event occurs, then at step 104 at least one thread's thread state data is migrated to a second thread state storage region 20 having fewer thread state entries 22 than the first thread state storage region 20. At step 106, a second thread group begins to be processed, comprising the threads whose state data was migrated to the second thread state storage region. The second thread group is processed in the same way as the first thread group, restarting the method at step 100 for the second thread group. Hence, there could be a further migration event triggering a migration of some of the threads of the second thread group to a further thread group. Meanwhile, at step 108 it is determined whether there are any active threads remaining in the first thread group. If so, the method returns to step 100 where the remaining threads continue to be processed as the first thread group. If there are no active threads remaining following the migration, then the first thread group is ended at step 102.

Although particular embodiments of the present technique have been described herein, it will be apparent that the invention is not limited to these, and that many modifications and additions may be made within the scope of the invention. For example, various combinations of the features of the following dependent claims may be made without departing from the scope of the invention.

I claim:

1. A data processing apparatus comprising:
a processor configured to process a plurality of threads each having associated thread state data;
wherein the processor is configured to process the plurality of threads in a plurality of thread groups, each thread group comprising a number of threads processed in parallel with a common program being executed for each thread of the thread group;
a plurality of thread state storage regions each comprising a fixed number of thread state entries, where each thread state entry is configured to store the thread state data including a thread program counter indicative of a next program instruction to be executed for a corresponding thread of the plurality of threads;
wherein at least two of the thread state storage regions have different fixed numbers of the thread state entries;
wherein the processor is configured to automatically select and process within the same thread group threads having thread state data stored in thread state entries of the same thread state storage region, and to automatically select and process within different thread groups threads having thread state data stored in thread state entries of different thread state storage regions; and
a migration control circuitry configured to maintain a divergence counter indicative of a number of times a difference in behavior is detected between at least one selected thread and at least one remaining thread;
wherein the migration control circuitry is configured to detect said difference in behavior in response to a divergence indicating instruction included in the common program, the divergence indicating instruction comprising a predetermined instruction having an associated divergence indicating flag, and to migrate said at least one selected thread in response to said divergence counter being greater than a predetermined migration threshold.

2. The data processing apparatus according to claim 1, comprising allocation circuitry configured to control allocation of the thread state data for a set of threads to be processed with a specified common program to thread state entries within one or more of the thread state storage regions.

3. The data processing apparatus according to claim 2, wherein the allocation circuitry is configured to allocate the thread state data for the set of threads to thread state entries within the fewest possible thread state storage regions.

4. The data processing apparatus according to claim 2, wherein the allocation circuitry is configured to allocate the thread state data for the set of threads to thread state entries to minimize a total number of unused thread state entries, said unused thread state entries comprising thread state entries not currently storing thread state data for a thread being processed by the processor which are within the same thread state storage region as another thread state entry currently storing thread state data for a thread being processed by the processor.

5. The data processing apparatus according to claim 2, wherein the allocation circuitry is configured to control the allocation of the thread state data based on a group size value specified for the specified common program, the group size value indicative of the number of threads to be processed with said specified common program.

6. The data processing apparatus according to claim 1, wherein the thread state data comprises at least one data value processed or generated by the corresponding thread.

7. The data processing apparatus according to claim 1, wherein each thread group is associated with a thread group program counter indicative of a next program instruction to be executed for the corresponding thread group.

8. The data processing apparatus according to claim 7, wherein the thread state data comprises a thread program counter indicative of a next program instruction to be executed for the corresponding thread,
and the thread group program counter for a thread group is derived from the thread program counter for each of the threads of the thread group.

9. The data processing apparatus according to claim 1, comprising migration control circuitry configured to migrate the thread state data for at least one selected thread from a first thread state storage region to a second thread state storage region in response to detecting a migration event.

10. The data processing apparatus according to claim 9, wherein the first thread state storage region has a greater number of the thread state entries than the second thread state storage region.

11. The data processing apparatus according to claim 9, wherein the migration event comprises the migration control circuitry detecting a difference in behaviour between the at least one selected thread and at least one remaining thread having thread state data stored in the first thread state storage region.

12. The data processing apparatus according to claim 9, wherein the migration control circuitry is configured to migrate the thread state data for the at least one selected thread to the second thread state storage region in response to the migration event if the number of threads of the at least one selected thread is less than or equal to the number of thread state entries of the second thread state storage region.

13. The data processing apparatus according to claim 11, wherein the migration control circuitry is configured to detect said difference in behaviour if the at least one remaining thread does not require further processing operations to be performed and the at least one selected thread requires at least one further processing operation to be performed.

14. The data processing apparatus according to claim 11, wherein the migration control circuitry is configured to detect said difference in behaviour if the at least one selected thread and the at least one remaining thread require different processing operations to be performed.

15. The data processing apparatus according to claim 11, wherein the migration control circuitry is configured to detect said difference in behaviour in response to detecting divergent memory accesses triggered by the at least one selected thread and the at least one remaining thread.

16. The data processing apparatus according to claim 15, wherein said divergent memory accesses comprise at least one of:
accesses to different cache lines of a cache memory;
accesses to different pages of memory; and
accesses which cannot be coalesced into a single memory access.

17. The data processing apparatus according to claim 11, wherein the migration control circuitry is configured to maintain a divergence counter indicative of a number of times said difference in behaviour is detected between said at least one selected thread and said at least one remaining thread; and
the migration control circuitry is configured to migrate said at least one selected thread in response to said divergence counter being greater than a predetermined migration threshold.

18. The data processing apparatus according to claim 11, wherein the migration control circuitry is configured to detect said difference in behaviour in response to a divergence indicating instruction included in the common program.

19. The data processing apparatus according to claim 18, wherein the divergence indicating instruction comprises a predetermined instruction having an associated divergence indicating flag.

20. The data processing apparatus according to claim 19, wherein the predetermined instruction comprises at least one of a load/store instruction and a branch instruction.

21. The data processing apparatus according to claim 1, comprising power control circuitry configured to place in a power saving state at least one thread state storage region not storing thread state data for a thread group currently being processed by the processor.

22. The data processing apparatus according to claim 1, comprising power control circuitry configured to place in a power saving state at least one thread state entry which does not currently hold thread state data for a thread being processed by the processor.

23. A data processing apparatus comprising:
processing means for processing a plurality of threads each having associated thread state data;
wherein the processing means is configured to process the plurality of threads in a plurality of thread groups, each thread group comprising a number of threads processed in parallel with a common program being executed for each thread of the thread group;
a plurality of thread state storage region means for storing the thread state data, each thread state storage region means comprising a fixed number of thread state entry means for storing the thread state data including a thread program counter indicative of a next program instruction to be executed for a corresponding thread of the plurality of threads;
wherein at least two of the thread state storage region means have different fixed numbers of the thread state entry means; and
the processing means is configured to automatically select and process within the same thread group threads having thread state data stored in thread state entry means of the same thread state storage region means, and to automatically select and process within different thread groups threads having thread state data stored in thread state entry means of different thread state storage region means; and
migration control means for maintaining a divergence counter means for indicating a number of times a difference in behavior is detected between at least one selected thread and at least one remaining thread;
wherein the migration control means is configured to detect said difference in behavior in response to a divergence indicating instruction included in the common program, the divergence indicating instruction comprising a predetermined instruction having an associated divergence indicating flag, and to migrate said at least one selected thread in response to said divergence counter means being greater than a predetermined migration threshold.

24. The data processing apparatus according to claim 1, wherein the plurality of thread state storage regions comprise at least one thread state storage region comprising a single thread state entry.

25. A method of processing a plurality of threads each having associated thread state data, the method comprising steps of:
  processing, as a first thread group, the plurality of threads in parallel with a common program being executed for each thread of the first thread group, wherein the thread state data includes a thread program counter indicative of a next program instruction to be executed for the threads of the first thread group, and wherein the thread state data is stored in thread state entries of a first thread state storage region comprising a first fixed number of the thread state entries;
  maintaining, by migration control circuitry, a divergence counter indicative of a number of times a difference in behavior is detected between at least one selected thread and at least one remaining thread, wherein the migration control circuitry detects said difference in behavior in response to a divergence indicating instruction included in the common program, the divergence indicating instruction comprising a predetermined instruction having an associated divergence indicating flag;
  wherein the divergence counter indicates a migration event resulting from said divergence counter being greater than the predetermined migration threshold;
  in response to the migration event, automatically migrating the thread state data for at least one selected thread of the first thread group to thread state entries of a second thread state storage region comprising a second fixed number of the thread state entries different to the first fixed number;
  in response to storing the thread state data in the second thread state storage region, automatically processing, as a second thread group, the at least one selected thread in parallel with the common program being executed for each thread of the second thread group.

* * * * *